Sept. 22, 1964     S. S. STATA     3,149,875
FLOOR GRATINGS FOR MOTOR VEHICLES
Filed Oct. 30, 1962     2 Sheets-Sheet 1
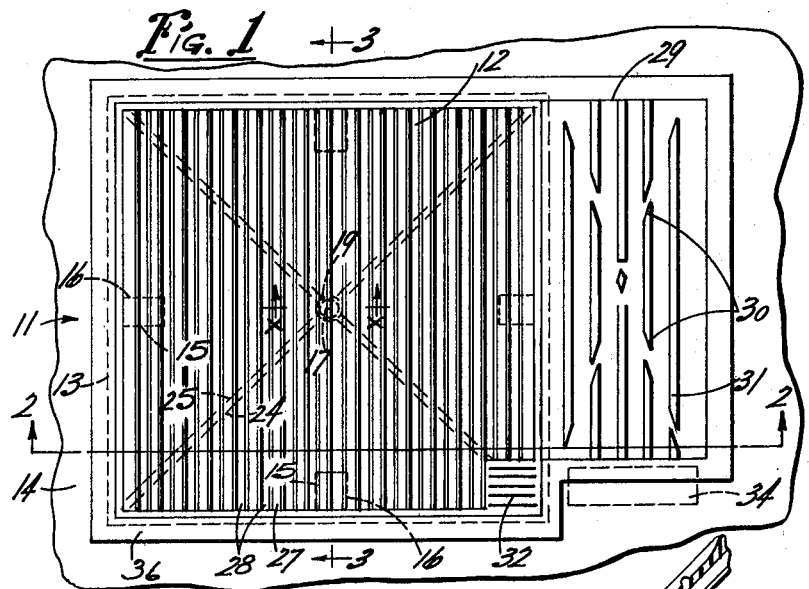
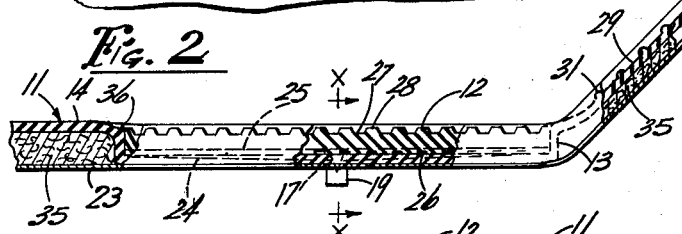
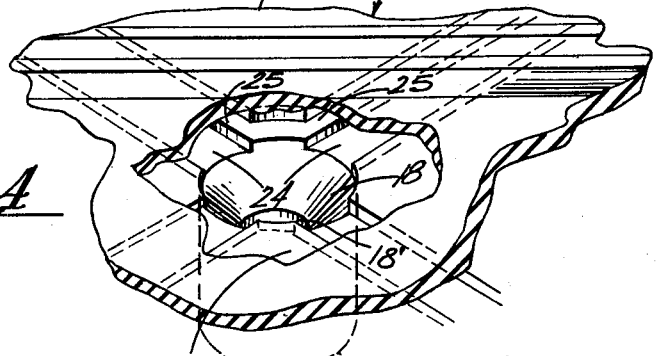
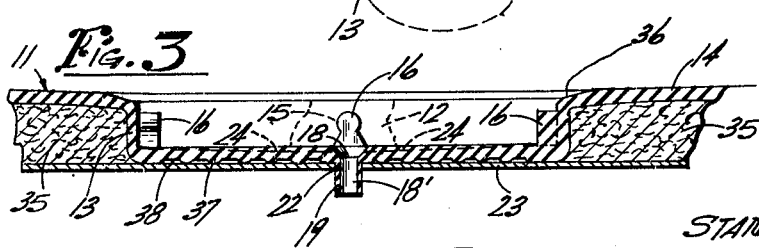
INVENTOR
STANLEY S. STATA

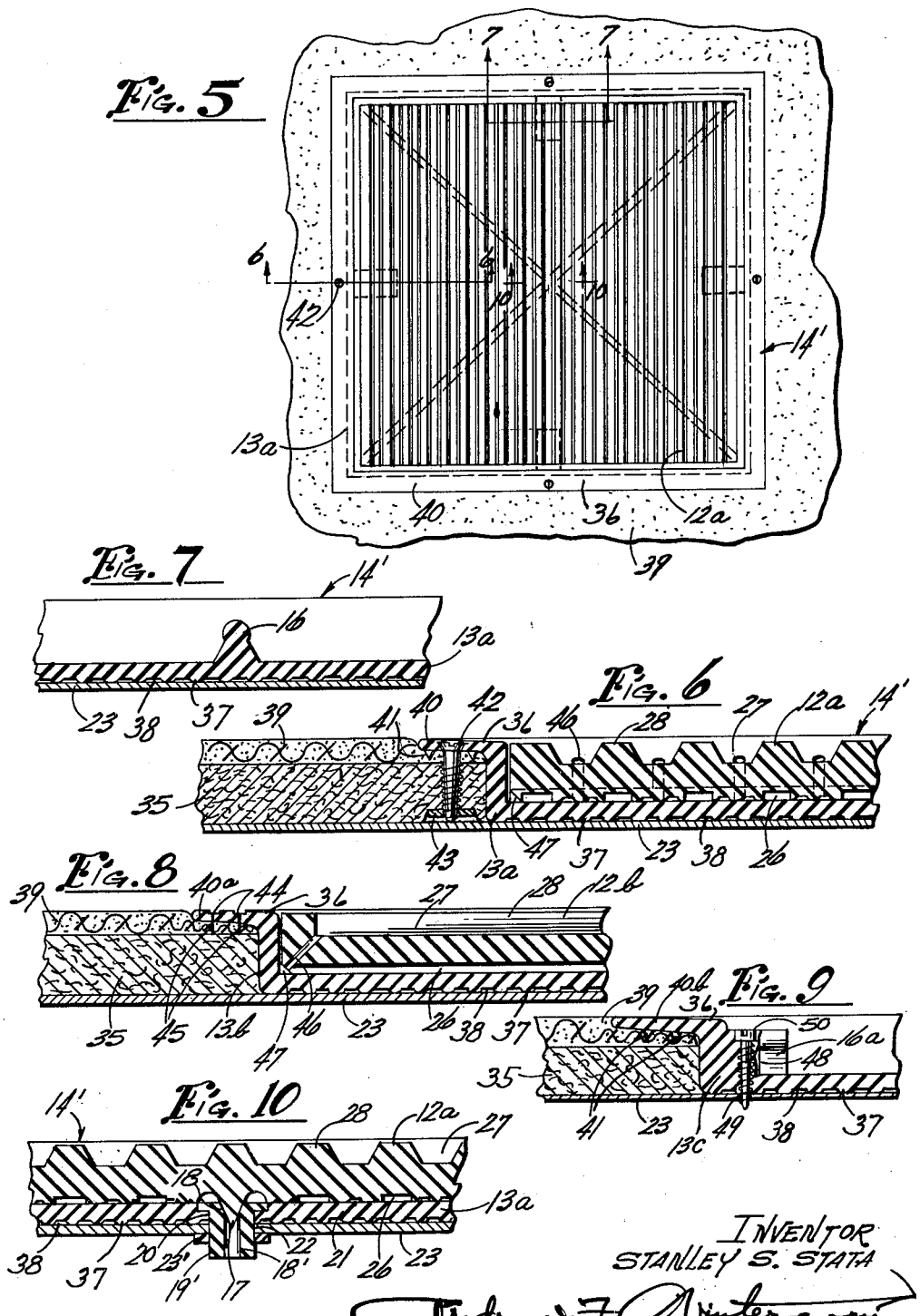

United States Patent Office 3,149,875
Patented Sept. 22, 1964

3,149,875
FLOOR GRATINGS FOR MOTOR VEHICLES
Stanley S. Stata, 301 Longwood St., Rockford, Ill.
Filed Oct. 30, 1962, Ser. No. 234,197
2 Claims. (Cl. 296—1)

This invention relates to floor gratings for motor vehicles and is more particularly concerned with improvements on the construction disclosed in my copending application, Serial No. 744,974, filed June 27, 1958, now Patent No. 3,082,032, issued March 19, 1963.

The principal object of my invention is to remedy a fault that has long been recognized in modern car construction, but never avoided, with a view to keeping floor coverings dry and clean under all weather conditions, and eliminating the danger of carpets and padding rotting from wetting, and metal floors becoming rusted even to the point of weakness and liability to breakthrough. The present gratings are designed to retain in the pans thereof the water resulting from the melting of snow and ice scraped off shoes, and usually such water will evaporate soon enough, although provision is made for drainage from the pan if the operator prefers. In either event, the floor covering is no longer subjected to the objectionable wetting and drying just mentioned. Safety in winter driving is also assured with such gratings because snow and ice can be scraped off the shoes before causing slippage on the pedals. These gratings also afford a recess where dirt can be swept and kept until it's convenient to clean it out. Vacuum cleaners are in general use nowadays and it is an easy matter to clean out such an accumulation in that way. The gratings when properly designed also actually improve the appearance of the vehicle's interior. The units may be made of different colors to match the interior of the motor vehicles or provide a pleasing contrast.

In accordance with my invention, one or more grating panels are provided, each disposed in a shallow pan that may be separate from the rest of the floor covering or be molded as an integral depressed part of a rubber floor mat resting on the usual felt deadener, except where the bottom of the pan portion rests directly on the floor and has a drain pipe entered in a hole provided in the floor for this purpose, the grating panel being in either case molded of flexible rubber or plastic material and having sufficient flexibility so that a conical downward projection provided on the panel in register with the drain pipe is arranged to close and seal the drain to avoid objectionable air noise and entry of fumes and dirt while the vehicle is in motion, while yet permitting opening of the drain long enough to permit drainage of water whenever that becomes necessary or desirable, as for example when the vehicle is being washed.

The pans for the gratings in the front seat compartment preferably include forward extensions covering appreciable areas of the toe-board, these extensions draining into the pans under the grating panels disposed therein, this being true whether the pans for the gratings are an integral part of an overall floor mat or are set in openings in the floor carpet.

In each form I prefer to provide an inwardly inclined surface around the top of each pan or depression for drainage into the pan or depression of any moisture in the vicinity.

The invention is illustrated in the accompanying drawings, in which—

FIG. 1 is a plan view of a floor grating for use in the front compartment of a motor vehicle;

FIG. 2 is a section on the line 2—2 of FIG. 1, showing the conical projection on the panel closing the drain opening in the pan;

FIG. 3 is a section through a similar construction designed for use in the rear compartment, the same corresponding to a section on the line 3—3 of FIG. 1, with the grating panel removed to better disclose the dovetail projections provided on opposite sides of the pan for interlocking engagement with the mating recesses provided in the grating panel, as indicated in dotted lines at the center of FIG. 3;

FIG. 4 is an enlarged perspective with the conical projection on the panel broken away but showing the drain opening in the pan with which said projection is adapted to cooperate, this view illustrating the drain channels provided in criss-cross relationship in the bottom of the pan, and registering channels provided in criss-cross relationship on the bottom of the grating panel whereby to insure good drainage from all sides to the center drain opening;

FIG. 5 is a plan view of a floor grating made in accordance with my invention designed primarily for use in a rear compartment or wherever existing floor carpeting is to remain and these gratings are to be installed after a rectangular section of the carpet and felt deadener thereBeneath has been cut out to make room for it;

FIG. 6 is an enlarged sectional detail on the line 6—6 of FIG. 5;

FIG. 7 is another enlarged sectional detail on line 7—7 of FIG. 5;

FIGS. 8 and 9 are views similar to FIG. 6 but show two other ways of fastening the pan, and FIG. 10 is a sectional detail on the line 10—10 of FIG. 5, this section corresponding however to one taken on the line x—x of FIGS. 1 and 2, showing the drain and its closure.

Similar reference numerals are applied to corresponding parts throughout these views.

Referring to the drawings and first to FIGS. 1 to 4, the reference numeral 11 designates a combination floor mat and grating in which the grating panel 12, which is molded of rubber or plastic material having the desired flexibility and resilience, is disposed in a pan 13 molded also of rubber or plastic material integral with the mat 14. The grating 12 and pan 13 are of rectangular form, the grating fitting with a fairly snug fit in the pan and having dove-tail shaped notches 15 provided therein on the four sides to receive with a fairly close fit dove-tail shaped bosses 16 provided in the pan 13 on its four sides, whereby to secure the grating in place in the pan and yet permit removal thereof or flexing the grating upwardly on one side sufficiently to unseat the conical valve projection 17 from the tapered seat 18 in drain opening 18', the valve projection 17 being provided integral with the bottom of the grating 12 in register with the drain opening 18' provided in a downwardly projecting neck 19 provided as an integral part of the bottom of the pan 13, as shown in FIG. 3, or as a separate flanged insert 19' cemented or otherwise suitably secured in a center hole 20 in the bottom 21 of a pan 13a, as seen in FIG. 10. In either event, the drain extends through a hole 22 provided in the sheet metal floor 23 of the vehicle, with or without a retaining ring or nut shown at 23' in FIG. 10 surrounding the protruding portion below the floor. Thus, assuming the vehicle has just been washed and there is water collected in the pan that should be drained out, this is easily accomplished by raising the central portion of the grating directly to unseat valve 17, or the grating 12 may be flexed upwardly sufficiently from either one of three sides sufficiently to accomplish the unseating of the valve. The snap fastenings at 15–16 facilitate this operation.

Drain grooves or channels 24 are provided in criss-cross relationship in the bottom of pan 13, and there are criss-cross grooves 25 provided in the bottom of the grating 12 in register with grooves 24 so that whatever water drains off the top of the grating 12 and finds its way down between the sides of the grating and the side walls of the pan 13 will easily find its way to the drain opening 18, and the pan 13 will accordingly be drained immediately when the valve 17 is opened. However, so long as the valve 17 remains seated there can be no drainage of water, and I rely upon evaporation to dry up whatever moisture usually collects in the pan 13. The closed valve 17 meanwhile prevents objectionable air noises and entry of fumes and dirt while the vehicle is in motion. There are parallel grooves 26 provided in the bottom of the grating 12 to conduct moisture from the opposite sides of the grating inwardly to the grooves 25, with which these grooves 26 intersect. Thus, any moisture running off the top of the grating 12 from the deep grooves 27 provided between the parallel ridges 28 will be drained quickly and contained in the registering grooves 24, 25 and 26 under the grating 12 until it is either evaporated or is drained quickly by opening valve 17.

The toe-board extension 29 on the front end of the mat 14 drains directly into the pan 13, and to facilitate such drainage there are criss-cross grooves 30 cut through the parallel ribs 31. The square heel pad indicated at 32 in FIG. 1 preferably is integral with grating panel 12 and extends the full depth of the pan 13 at that corner thereof, the mat 14 having a suitable opening provided therein or cut therein in front of the heel pad 32 to clear the accelerator pedal, indicated in dotted lines at 34.

The usual felt or jute sound deadening pad is indicated at 35 between the floor 23 and the mat 14, and the mat is preferably molded with an inclined surface 36 around three sides of the pan 13 and around three sides of extension 29 for good drainage from the mat into the pan. The bottom of the pan 13 preferably has longitudinally extending ribs 37 on the under side thereof for line contact with the floor 23, these ribs being spaced as indicated at 38 to leave ample air space between the pan and floor 23 to reduce likelihood of the latter rusting in the event of any condensation on the outside of the pan or on the floor itself, even though as is well-known, the floor is usually protected by a covering of tar-paper or is suitably coated to resist corrosion.

In operation, the driver in winter can upon entering a motor vehicle equipped with a floor grating of the present kind scrape off any snow or ice from his shoes on the foot scraper ribs 28 and in a short time the warmth in the car due to the heater causes this snow or ice to melt, and the water resulting therefrom drains off the grating 12 into the pan 13, thereby keeping the interior of the vehicle relatively dry. With the heater in operation, there is ample air circulation to dry up this moisture reasonably soon even though the moisture is more or less covered up by the grating 12. In the event too much moisture collects, it is a simple matter to raise the grating 12 at the center or at one side and thereby open the valve 17 for immediate drainage of the moisture. In the meantime, so long as the valve 17 is closed it prevents objectionable air noise in the operation of the vehicle and excludes fumes and dirt, as well as cold air. The grooves 24 and 25 and intersecting grooves 26 all furnish adequate storage space for whatever moisture is apt to collect in the pans 13, so that the ribbed top 27–28 of the gratings will be dry.

The unit 14′ illustrated in FIGS. 5, 6, 7 and 10 is designed for use primarily in the rear compartments of existing automobiles after a rectangular section of the carpet 39 and the felt or jute sound deadening pad 35 therebeneath has been cut out to make room for it. The construction, however, is equally well adapted for application to motor vehicles as original equipment. In a unit 14′ for a front compartment, a toe-board extension like that shown at 29 in FIGS. 1 and 2 would usually be provided on the front of the pan 13a, although some motorists might prefer to use the same units 14′ for front and rear compartments, as shown in FIG. 5. The marginal flange 40 molded integral with the side walls of the pan 13a preferably has downward projections 41 adapted to be impressed in the carpet 39 around the hole, and screws 42 entered in holes in the flange 40 pass through the pad of sound deadening material 35 and are threaded in nuts 43 under pad 35. The grating 12a is the same as the grating 12 of FIGS. 1, 2 and 4 and cooperates with the pan 13a and its drain 19′ in a similar way, and corresponding parts have therefore been numbered the same in these views.

Referring to FIG. 8, the pan 13b shown here is intended for use as original equipment and is like the pan 13a in all other respects but its flange 40a has portions 44 of reduced thickness along the four sides of the pan to facilitate sewing the carpet 39 to the flange 40a as indicated by the stitches 45. The grating 12b in this form is the same as the grating 12a. Both have at the ends of the grooves 27 between the ridges 28 drain holes 46 extending diagonally downwardly to communication with the bevelled edges 47 on the bottom of the grating as seen in full lines in FIG. 8 and indicated in dotted lines in FIG. 6. The construction is otherwise the same as that of FIGS. 5, 6, 7 and 10 and operates similarly as that of FIGS. 1 to 4.

Referring to FIG. 9, the pan 13c is similar to the pans 13a and 13b and here the flange 40b resembles the flange 40 of FIG. 6 and has similar anchoring projections 41 on the under side thereof to grip the carpet, but in this case there are four bosses 48 in the pan on the inner side located the same as bosses 16 but provided with vertical holes registering with holes 49 made in the floor 23 to permit fastening the pan directly to the floor 23 by means of screws 50 entered in the holes in the bosses 48. The bosses 48 are provided preferably integral with the dovetail projections 16a provided on the four sides of the pan for snap fastening of the grating, similarly as bosses 16 described above in connection with FIGS. 1 to 4. The grating employed here except for clearance at bosses 48 is the same as that shown in FIGS. 5, 6, 8 and 10, and is similar to that shown in FIGS. 1, 2 and 4.

It is believed the foregoing description conveys a good understanding of the objects and advantages of my invention. The appended claims have been drawn to cover all legitimate modifications and adaptations.

I claim:

1. In a motor vehicle having a floor with a small opening provided therein, a mat covering the floor, a shallow pan the top of which is substantially flush with the top surface of the mat so that dirt can be swept off the mat into the pan conveniently, said pan having a central drain opening communicating with the floor opening for drainage of moisture from the pan through the floor opening, a foot scraper grating panel having scraping projections on its top surface, said panel being removably disposed in said pan substantially flush with the top thereof and draining into said pan, whereby dirt, water, snow and ice may be scraped off into the pan, said pan and panel being constructed to collect and retain water therebetween below the top surface of said panel when the drain opening is closed, and a closure on the central portion of said panel and extending downwardly therefrom normally closing the drain opening, said closure being raisable by means of said panel to uncover the drain opening for drainage of moisture from the pan.

2. In a vehicle having a floor and a floor covering, a floor pan and grating combination of the character described comprising a shallow generally rectangular pan defining a depression in the floor covering substantially flush with the top surface of said floor covering so that dirt can be swept off the floor covering into the pan conveniently and moisture will also drain off said floor covering into said pan, and a generally rectangular foot scraper grating panel removably disposed in said pan, said pan having moisture collecting grooves defined in the bottom wall thereof under said panel, and said panel having grooves provided in the top and bottom surfaces thereof, the grooves in the top surface being deep and defined between scraper ribs suitable for scraping off snow, water, and dirt from the bottom of shoes while the grooves serve to collect moisture and dirt and retain the moisture during evaporation while leaving the top surfaces of the ribs fairly dry, the panel draining moisture from these grooves into said pan, the grooves in the bottom of the panel providing with the grooves in the bottom wall of the pan added storage space for moisture, the pan having a drain opening provided in a low portion thereof, and said grating panel having a closure thereon for closing said opening, whereby said pan may be drained by flexing that portion of the panel carrying the closure on it or removing said panel.

References Cited in the file of this patent

UNITED STATES PATENTS

| | | |
|---|---|---|
| 1,019,212 | Yates | Mar. 5, 1912 |
| 1,602,240 | Miller | Oct. 5, 1926 |
| 2,650,855 | Pierce | Sept. 1, 1953 |
| 2,810,672 | Taylor | Oct. 22, 1957 |
| 3,087,752 | Winchester | Apr. 30, 1963 |

UNITED STATES PATENT OFFICE
CERTIFICATE OF CORRECTION

Patent No. 3,149,875　　　　　　　　　　　　　September 22, 1964

Stanley S. Stata

It is hereby certified that error appears in the above numbered patent requiring correction and that the said Letters Patent should read as corrected below.

Column 4, line 73, after "rectangular" insert -- flexible --.

Signed and sealed this 26th day of January 1965.

(SEAL)
Attest:

ERNEST W. SWIDER
Attesting Officer

EDWARD J. BRENNER
Commissioner of Patents